United States Patent
Vassiliou et al.

(10) Patent No.: US 7,924,944 B2
(45) Date of Patent: *Apr. 12, 2011

(54) METHOD AND SYSTEM FOR MULTI-BAND DIRECT CONVERSION COMPLIMENTARY METAL-OXIDE-SEMICONDUCTOR (CMOS) MOBILE TELEVISION TUNER

(75) Inventors: Iason F. Vassiliou, Athens (GR); Konstantinos D. Vavelidis, Ilioupolis (GR); Stamatios A. Bouras, Ilioupolis (GR); Spyridon C. Kavadias, Voula (GR); Ioannis G. Kokolakis, Holargos (GR); Georgios S. Kamoulakos, Athens (GR); Aristeidis I. Kyranas, Zografou (GR); Charalampos P. Kapnistis, Pefki (GR); Nikolaos C. Haralabidis, Athens (GR)

(73) Assignee: Broadcom Corporation, Irvine, CA (US)

( * ) Notice: Subject to any disclaimer, the term of this patent is extended or adjusted under 35 U.S.C. 154(b) by 815 days.

This patent is subject to a terminal disclaimer.

(21) Appl. No.: 11/385,390

(22) Filed: Mar. 21, 2006

(65) Prior Publication Data

US 2007/0066272 A1    Mar. 22, 2007

Related U.S. Application Data

(60) Provisional application No. 60/717,915, filed on Sep. 16, 2005, provisional application No. 60/778,232, filed on Mar. 2, 2006.

(51) Int. Cl.
*H03K 9/00* (2006.01)
(52) U.S. Cl. ........................ 375/316; 375/345
(58) Field of Classification Search ................. 375/316, 375/345
See application file for complete search history.

(56) References Cited

U.S. PATENT DOCUMENTS

| | | | |
|---|---|---|---|
| 7,092,043 B2 * | 8/2006 | Vorenkamp et al. | 348/726 |
| 7,171,176 B1 * | 1/2007 | Birleson | 455/173.1 |
| 2003/0069036 A1 * | 4/2003 | Forrester | 455/552 |
| 2003/0119466 A1 * | 6/2003 | Goldman | 455/260 |
| 2005/0147192 A1 * | 7/2005 | Yamamoto et al. | 375/345 |
| 2005/0276358 A1 * | 12/2005 | Pipilos | 375/345 |
| 2006/0035619 A1 * | 2/2006 | Hallivuori et al. | 455/333 |
| 2006/0068740 A1 * | 3/2006 | Yokoyama | 455/302 |

(Continued)

OTHER PUBLICATIONS

Womac, "Global mobile TV standard makes it possible to tune in digital TV signals on the move", Jun. 2005.*

(Continued)

*Primary Examiner* — Juan A Torres
(74) *Attorney, Agent, or Firm* — McAndrews, Held & Malloy, Ltd.

(57) ABSTRACT

Aspects of a method and system for a multi-band direct conversion complementary metal-oxide-semiconductor (CMOS) mobile television tuner are provided. A single-chip multi-band radio frequency (RF) receiver in a mobile terminal comprising UHF and L-band front-ends receives and amplifies an RF signal utilizing a low noise amplifier (LNA) an LNA integrated into the front-end that corresponds to the type of signal received. A received signal strength indicator (RSSI) value may be determined for the amplified signal within the receiver and may be utilized to adjust a gain of the LNA. The adjustment may be made via on-chip or off-chip processing of the RSSI value. The receiver may directly convert the amplified signal to a baseband frequency signal and generate in-phase and quadrature components. The components of the baseband frequency signal may be filtered and/or amplified via programmable devices within the receiver. Circuitry within the receiver may be controller via an on-chip digital interface.

27 Claims, 6 Drawing Sheets

U.S. PATENT DOCUMENTS

| | | | |
|---|---|---|---|
| 2006/0135195 A1* | 6/2006 | Leinonen et al. | 455/550.1 |
| 2006/0276149 A1* | 12/2006 | Womac et al. | 455/133 |
| 2007/0049224 A1* | 3/2007 | Womac | 455/189.1 |

OTHER PUBLICATIONS

Antoine, "A direct-conversion receiver for DVB-H", ISSCC 2005 IEEE International Solid-State Circuits Conference, 2005, Digest of Technical Papers, Feb. 10-10, 2005 pp. 426-607 vol. 1.*

Love, "Single-chip tuner enables broadcast TV in both European and North American handsets", eeProductCenter (Jun. 06, 2005 6:32 AM ET.*

Vassiliou, "A 0.18/spl mu/m CMOS Dual-Band Direct-Conversion DVB-H Receiver", ISSCC 2006, Digest of Technical Papers, IEEE International Solid-State Circuits Conference, 2006, Feb. 6-9, 2006 pp. 2494-2503.*

Magoon, "A single-chip quad-band (850/900/1800/1900 MHz) direct conversion GSM/GPRS RF transceiver with integrated VCOs and fractional-N synthesizer", IEEE Journal of Solid-State Circuits, vol. 37, Issue 12, Dec. 2002 pp.1710-1720.*

Molnar, "A single-chip quad-band (850/900/1800/1900 MHz) direct-conversion Gsm/Gprs Rf transceiver with integrated VCOs and fractional-n. synthesizer", 2002 IEEE International Solid-State Circuits Conference, 2002. Digest of Technical Papers, Isscc, vol. 1, 3-7 Feb. 2002 Page(s):232 - 462 vol. 1.*

Molnar, "A single-chip quad-band [850/900/1800/1900MHz] direct conversion GSM/GPRS RF transceiver with integrated VCOs and fractional-N. synthesizer", 2002 IEEE International Solid-State Circuits Conference, 2002, Digest of Technical Papers, ISSCC, vol. 2, Feb 3-7, 2002 pp.184-463.*

Kim, "System level design of multi-standard receiver using reconfigurable RF block," J. Semicond. Technol.Sci., vol. 4, No. 3, Sep. 2004.*

Rogers A multiband $\Delta\Sigma$ fractional-N. frequency synthesizer for a MIMO WLAN transceiver RFIC, Solid-State Circuits, IEEE Journal of Volume 40, Issue 3, Mar 2005 pp.678-689.*

Temporiti, "A 700-kHz bandwidth $\Delta\Sigma$ fractional synthesizer with spurs compensation and linearization techniques for WCDMA applications," in IEEE Int. Solid-State Circuits Conf. Dig. Tech. Papers, San Francisco, CA, Feb. 2004, pp. 1446-1454.*

Koli, "A 2.5 V temperature compensated CMOS logarithmic amplifier" in Proc. IEEE Custom Integrated Circuits Conf., Santa Clara, CA, May 1997, pp. 79-82.*

Patrick Antonine, et al., *A Direct-Conversion Receiver for DVB-H*, IEEE Journal of Solid-State Circuits, vol. 40, No. 12, Dec. 2005, pp. 2536-2546.

Mark Dawkins, Alison Payne Burdett, Nick Cowley, *A Single-Chip Tuner for DVB-T*, IEEE Journal of Solid-State Circuits, vol. 38, No. 8, Aug. 2003, pp. 1307-1317.

EICTA—European Industry Association, Information Systems Communication Technologies Consumer Electronics, EICTA/TAC/MBRAI-0216, *Mobile and Portable Dvb-T Radio Access Interface Specification*, Version 1.0, Jan. 1, 2004, pp. 1-46.

* cited by examiner

METHOD AND SYSTEM FOR MULTI-BAND DIRECT CONVERSION COMPLIMENTARY METAL-OXIDE-SEMICONDUCTOR (CMOS) MOBILE TELEVISION TUNER

CROSS-REFERENCE TO RELATED APPLICATIONS/INCORPORATION BY REFERENCE

This application makes reference to, claims priority to, and claims the benefit of:

U.S. Provisional Application Ser. No. 60/717,915 filed on Sep. 16, 2005; and
U.S. Provisional Application Ser. No. 60/778,232 filed on Mar. 2, 2006.

This application also makes reference to:
U.S. application Ser. No. 11/385,423 filed on Mar. 21, 2006;
U.S. application Ser. No. 11/385,389 filed on Mar. 21, 2006;
U.S. application Ser. No. 11/385,401 filed on Mar. 21, 2006;
U.S. application Ser. No. 11/385,081 filed on Mar. 21, 2006; and
U.S. application Ser. No. 11/385,101 filed on Mar. 21, 2006.

Each of the above stated applications is hereby incorporated herein by reference in its entirety.

FIELD OF THE INVENTION

Certain embodiments of the invention relate to on-chip radio frequency (RF) tuners. More specifically, certain embodiments of the invention relate to a method and system for a multi-band direct conversion complimentary metal-oxide semiconductor (CMOS) mobile television tuner.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems, ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

Standards for digital television terrestrial broadcasting (DTTB) have evolved around the world with different systems being adopted in different regions. The three leading DTTB systems are, the advanced televisions systems committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. This technique may result in spectral efficiency and lower multi-path distortion, for example. The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area single frequency network (SFN). There are also significant challenges in deploying broadcast services to mobile user equipment. Because of form factor constraints, many handheld portable devices, for example, may require that PCB area be minimized and that services consume minimum power to extend battery life to a level that may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H). The broadcasting frequencies for Europe are in UHF (bands IVN) and in the US, the 1670-1675MHz band that has been allocated for DVB-H operation. Additional spectrum is expected to be allocated in the L-band world-wide.

To meet requirements for mobile broadcasting the DVB-H specification supports time slicing to reduce power consumption at the user equipment, addition of a 4 k mode to enable network operators to make tradeoffs between the advantages of the 2 k mode and those of the 8 k mode, and an additional level of forward error correction on multi-protocol encapsulated data —forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM).

While several adaptations have been made to provide support for mobile broadcast capabilities in DVB-T, concerns regarding device size, cost, and/or power requirements still remain significant constraints for the implementation of handheld portable devices enabled for digital video broadcasting operations. For example, typical DVB-T tuners or receivers in mobile terminals may employ super-heterodyne architectures with one or two intermediate frequency (IF) stages and direct sampling of the passband signal for digital quadrature down-conversion. Moreover, external tracking and surface acoustic wave (SAW) filters may generally be utilized for channel selection and image rejection. Such approaches may result in increased power consumption and high external component count, which may limit their application in handheld portable devices. In this regard, the ability to integrate more functionality into fewer and/or smaller devices may be important in meeting the space and size requirements of many handheld portable devices. As a result, the success of mobile broadcast capability of DVB-T may depend in part on the ability to develop TV tuners with more integrated functionality and that have smaller form factor, are produced at lower cost, and consume less power during operation.

In the presence of large blocker signals, the gain of the low noise amplifier (LNA) mixers, and other components of the receiver have to be very linear, that is, the output has to have a linear relationship with the input, to maintain the performance of the receiver. This causes increased power consumption by the receiver due to the highly linear characteristics of various components in the receiver. Blocker signals are unwanted signals in frequency channels outside the wanted channel that disturb the reception of the wanted signals. This happens due to the fact that the blockers generate large signals within the receiver path. These large signals may introduce harmonics and intermodulation products or unwanted mixing products that crosstalk with the wanted signals. Similarly, when the required RF signal is weak, there is an increase in the power consumption of the receiver to achieve a good noise factor (NF) and a good phase noise. In handheld communication devices such as cell phones, and smart phones, the increased power consumption may significantly drain the battery that powers these devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a multi-band direct conversion CMOS mobile television tuner, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a multi-band direct conversion CMOS mobile television tuner. A single-chip multi-band radio frequency (RF) receiver in a mobile terminal may comprise ultra-high frequency (UHF) and L-band front-ends. The single-chip multi-band RF receiver may also be referred to as an RF tuner, for example. The single-chip receiver may receive an RF signal and amplifies the received signal utilizing a low-noise amplifier (LNA) integrated into the front-end that corresponds to the type of signal received. A received signal strength indicator (RSSI) value may be determined for the amplified signal within the single-chip receiver and may be utilized to adjust a gain of the LNA. The adjustment may be achieved via on-chip or off-chip processing of the RSSI value. The single-chip receiver may directly convert the amplified signal to a baseband frequency signal and generate in-phase (I) and quadrature (Q) components. The components of the baseband frequency signal may be filtered and/or amplified via programmable devices within the single-chip receiver. Circuitry within the single-chip receiver may be controlled via an on-chip digital interface.

Figure 1A:
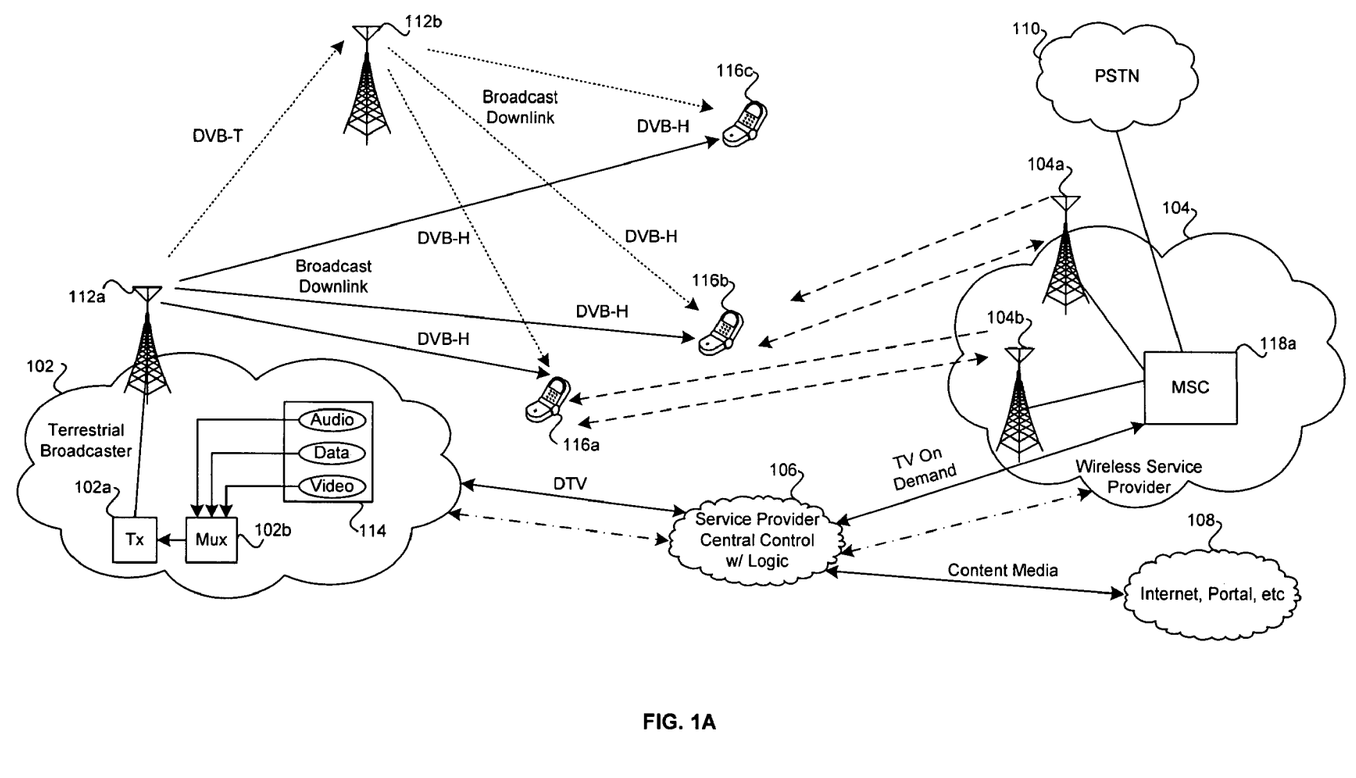
FIG. 1A is a block diagram illustrating an exemplary system for providing integrated services to a plurality of mobile terminals via a cellular network and/or a digital video broadcast network, in accordance with an embodiment of the invention.

FIG. 1A is a block diagram of an exemplary system for providing integrated services to a plurality of mobile terminals via a cellular network and/or a digital video broadcast network, in accordance with an embodiment of the invention. Referring to FIG. 1A, there is shown terrestrial broadcaster network 102, wireless service provider network 104, service provider 106, portal 108, public switched telephone network (PSTN) 110, and mobile terminals 116a, 116b, and 116c. The terrestrial broadcaster network 102 may comprise transmitter (Tx) 102a, multiplexer (Mux) 102b, and information content source 114. The content source 114 may also be referred to as a data carousel, which may comprise audio, data and video content. The terrestrial broadcaster network 102 may also comprise DVB broadcast antennas 112a and 112b that may be adapted to transmit DVB-based information, such as DVB-T or DVB-H, to the mobile terminals 116a, 116b, and 116c. In this regard, the DVB broadcast antennas 112a and 112b may communicate with each other via DVB-T and with the mobile terminals via DVB-H, for example. The wireless service provider network 104 may comprise mobile switching center (MSC) 118a, and a plurality of cellular base stations 104a and 104b.

The terrestrial broadcaster network 102 may comprise suitable equipment that may be enable encoding and/or encryption of data for transmission via the transmitter 102a. The transmitter 102a in the terrestrial broadcaster network 102 may enable utilizing DVB broadcast channels to communicate information to the mobile terminals. In this regard, the transmitter 102a may enable DVB-H transmission to the mobile terminals via the UHF band, such as bands IV/V, the 1670-1675 MHz band, and/or the L-band, for example. The multiplexer 102b associated with the terrestrial broadcaster network 102 may be utilized to multiplex data from a plurality of sources. For example, the multiplexer 102b may be adapted to multiplex various types of information such as audio, video and/or data into a single pipe for transmission by the transmitter 102a. Content media from the portal 108, which may be handled by the service provider 106, may also be multiplexed by the multiplexer 102b. The portal 108 may be an ISP service provider. The mobile terminals 116a, 116b, and/or 116c may receive DVB-H broadcast services from the DVB broadcasting antennas 112a or 112b based on whether the mobile terminal is within the operating range of the DVB broadcasting antenna.

In one aspect of the invention, the terrestrial broadcaster network 102 may enable providing one or more digital television (DTV) channels to the service provider 106. In this regard, the terrestrial broadcaster network 102 may comprise suitable high-speed or broadband interfaces that may be utilized to facilitate transfer of the DTV channels from the terrestrial broadcast network 102 to the service provider. The service provider 106 may then utilize at least a portion of the DTV channels to provide television (TV) on demand service, or other similar types of services to the wireless service provider network 104. Accordingly, the service provider 106 may further comprise suitable high-speed or broadband interfaces that may be utilized to facilitate the transfer of related TV on demand information to the MSC 118a. The communication links between the terrestrial broadcast network 102 and the service provider 106 and the communication links between the service provider 106 and the wireless service provider 104 may be wired and/or wireless communication links.

The wireless service provider network 104 may be a cellular or personal communication service (PCS) provider that may enable broadcasting UMTS (B-UMTS), for example. The term cellular as utilized herein refers to both cellular and PCS frequencies bands. Hence, usage of the term cellular may comprise any band of frequencies that may be utilized for cellular communication and/or any band of frequencies that may be utilized for PCS communication. Notwithstanding, broadcast UMTS (B-UMTS) may also be referred to as MBMS. MBMS is a high-speed data service that is overlaid on WCDMA to provide much higher data rates than may be provided by core WCDMA. In this regard, the B-UMTS services may be superimposed on the cellular or PCS network.

The wireless service provider network 104 may utilize cellular or PCS access technologies such as GSM, CDMA, CDMA2000, WCDMA, AMPS, N-AMPS, and/or TDMA, for example. The cellular network may be utilized to offer bi-directional services via uplink and downlink communication channels, while the B-UMTS or MBMS network may be utilized to provide unidirectional broadband services via a downlink channel. The B-UMTS or MBMS unidirectional downlink channel may be utilized to broadcast content media and/or multimedia type information to the mobile terminals 116a and 116b. Although MBMS provides only unidirectional downlink communication, other bidirectional communication methodologies comprising uplink and downlink capabilities, whether symmetric or asymmetric, may be utilized.

The wireless service provider network 104 need not be limited to a GSM, CDMA, WCDMA based network and/or variants thereof. In this regard, the wireless service provider network 104 may be an 802.11 based wireless network or wireless local area network (WLAN). The wireless service provider network 104 may also be adapted to provide 802.11 based wireless communication in addition to GSM, CDMA, WCDMA, CDMA2000 based network and/or variants thereof. In this case, the mobile terminals 116a, 116b may also be compliant with the 802.11-based wireless network.

The service provider 106 may comprise suitable interfaces, circuitry, logic and/or code that may enable communication between the terrestrial broadcasting network 102 and the wireless communication network 104. The service provider 106 may enable its interfaces to facilitate exchange control information with the terrestrial broadcast network 102 and to exchange control information with the wireless service provider 104. The control information exchanged by the service provider 106 with the terrestrial broadcasting network 102 and the wireless communication network 104 may be utilized to control certain operations of the mobile terminals, the terrestrial broadcast network 102 and the wireless communication network 104.

The portal 108 may comprise suitable logic, circuitry and/or code that may enable providing content media to the service provider 106 via one or more communication links. These communication links, although not shown, may comprise wired and/or wireless communication links. The content media that may be provided by the portal 108 may comprise audio, data, video or any combination thereof. In this regard, the portal 108 may provide one or more specialized information services to the service provider 106.

The public switched telephone network (PSTN) 110 may be coupled to the MSC 118a. Accordingly, the MSC 118a may enable switching of calls originating from within the PSTN 110 to one or more mobile terminals serviced by the wireless service provider 104. Similarly, the MSC 118a may enable switching of calls originating from mobile terminals serviced by the wireless service provider 104 to one or more telephones serviced by the PSTN 110.

The information content source 114 may comprise a data carousel. In this regard, the information content source 114 may provide various information services, which may comprise online data including audio, video and data content. The information content source 114 may also comprise file download, and software download capabilities. In instances where a mobile terminal fails to acquire requested information from the information content source 114 or the requested information is unavailable, then the mobile terminal may acquire the requested information via, for example, B-UMTS from the portal 108. The request may be initiated through an uplink cellular communication path.

The mobile terminals 116a, 116b, and 116c may comprise suitable logic, circuitry and/or code that may enable handling the processing of uplink and downlink cellular channels for various access technologies and broadcast DVB-H technologies. In an exemplary embodiment of the invention, the mobile terminals 116a, 116b, and 116c may enable utilizing one or more cellular access technologies such as GSM, GPRS, EDGE, CDMA, WCDMA, CDMA2000, HSDPA and MBMS (B-UMTS). The mobile terminal may also enable receiving and processing DVB-H broadcast signals in the DVB-H bands. A mobile terminal may also enable requesting information via a first cellular service and in response, receive corresponding information via a DVB-H broadcast service. A mobile terminal may also enable requesting of information from a service provider via a cellular service and in response, receive corresponding information via a data service, which is provided via the cellular service. The mobile terminals may also be adapted to receive DVB-H broadcast information from the base stations 104a or 104b or from the DVB-H broadcast antennas 112a and 112b. In instances where a mobile terminal receives broadcast information from any of the base stations 104a or 104b via a downlink MBMS communication channel, then the mobile terminal may communicate corresponding uplink information via an uplink cellular communication channel.

Figure 1B:
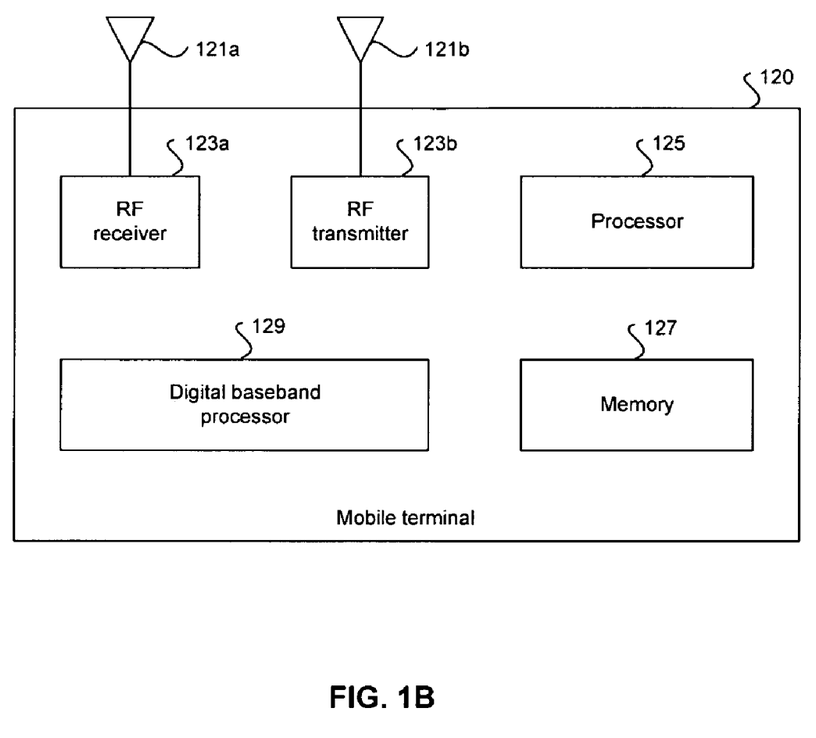
FIG. 1B is a block diagram illustrating an exemplary mobile terminal, in accordance with an embodiment of the invention.

FIG. 1B is a block diagram illustrating an exemplary mobile terminal, in accordance with an embodiment of the invention. Referring to FIG. 1B, there is shown a mobile terminal 120 that may comprise an RF receiver 123a, an RF transmitter 123b, a digital baseband processor 129, a processor 125, and a memory 127. A receive antenna 121a may be communicatively coupled to the RF receiver 123a. A transmit antenna 121b may be communicatively coupled to the RF transmitter 123b. The mobile terminal 120 may be operated in a system, such as the cellular network and/or digital video broadcast network described in FIG. 1A, for example.

The RF receiver 123a may comprise suitable logic, circuitry, and/or code that may enable processing of received RF signals. The RF receiver 123a may enable receiving RF signals in a plurality of frequency bands. For example, the RF receiver 123a may enable receiving DVB-H transmission signals via the UHF band, from about 470 MHz to about 890 MHz, the 1670-1675 MHz band, and/or the L-band, from about 1400 MHz to about 1700 MHz, for example. Moreover, the RF receiver 123a may enable receiving signals in cellular frequency bands, for example. Each frequency band supported by the RF receiver 123a may have a corresponding front-end circuit for handling low noise amplification and down conversion operations, for example. In this regard, the RF receiver 123a may be referred to as a multi-band receiver when it supports more than one frequency band. In another embodiment of the invention, the mobile terminal 120 may comprise more than one RF receiver 123a, wherein each of the RF receivers 123a may be a single-band or a multi-band receiver.

The RF receiver 123a may quadrature down convert the received RF signal to a baseband frequency signal that comprises an in-phase (I) component and a quadrature (Q) component. The RF receiver 123a may perform direct down conversion of the received RF signal to a baseband frequency signal, for example. In some instances, the RF receiver 123a may enable analog-to-digital conversion of the baseband signal components before transferring the components to the digital baseband processor 129. In other instances, the RF receiver 123a may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123a and/or signals to be transferred to the RF transmitter 123b, when the RF transmitter 123b is present, for transmission to the network. The digital baseband processor 129 may also provide control and/or feedback information to the RF receiver 123a and to the RF transmitter 123b based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123b for transmission to the network.

The RF transmitter 123b may comprise suitable logic, circuitry, and/or code that may enable processing of RF signals for transmission. The RF transmitter 123b may enable transmission of RF signals in a plurality of frequency bands. Moreover, the RF transmitter 123b may enable transmitting signals in cellular frequency bands, for example. Each frequency band supported by the RF transmitter 123b may have a corresponding front-end circuit for handling amplification and up conversion operations, for example. In this regard, the RF transmitter 123b may be referred to as a multi-band transmitter when it supports more than one frequency band. In another embodiment of the invention, the mobile terminal 120 may comprise more than one RF transmitter 123b, wherein each of the RF transmitters 123b may be a single-band or a multi-band transmitter.

The RF transmitter 123b may quadrature up convert the baseband frequency signal comprising I/Q components to an RF signal. The RF transmitter 123b may perform direct up conversion of the baseband frequency signal to a baseband frequency signal, for example. In some instances, the RF transmitter 123b may enable digital-to-analog conversion of the baseband signal components received from the digital baseband processor 129 before up conversion. In other instances, the RF transmitter 123b may receive baseband signal components in analog form.

The processor 125 may comprise suitable logic, circuitry, and/or code that may enable control and/or data processing operations for the mobile terminal 120. The processor 125 may be utilized to control at least a portion of the RF receiver 123a, the RF transmitter 123b, the digital baseband processor 129, and/or the memory 127. In this regard, the processor 125 may generate at least one signal for controlling operations within the mobile terminal 120. The processor 125 may also enable executing of applications that may be utilized by the mobile terminal 120. For example, the processor 125 may execute applications that may enable displaying and/or interacting with content received via DVB-H transmission signals in the mobile terminal 120.

The memory 127 may comprise suitable logic, circuitry, and/or code that may enable storage of data and/or other information utilized by the mobile terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the RF receiver 123a to enable receiving DVB-H transmission in the appropriate frequency band.

Figure 1C:
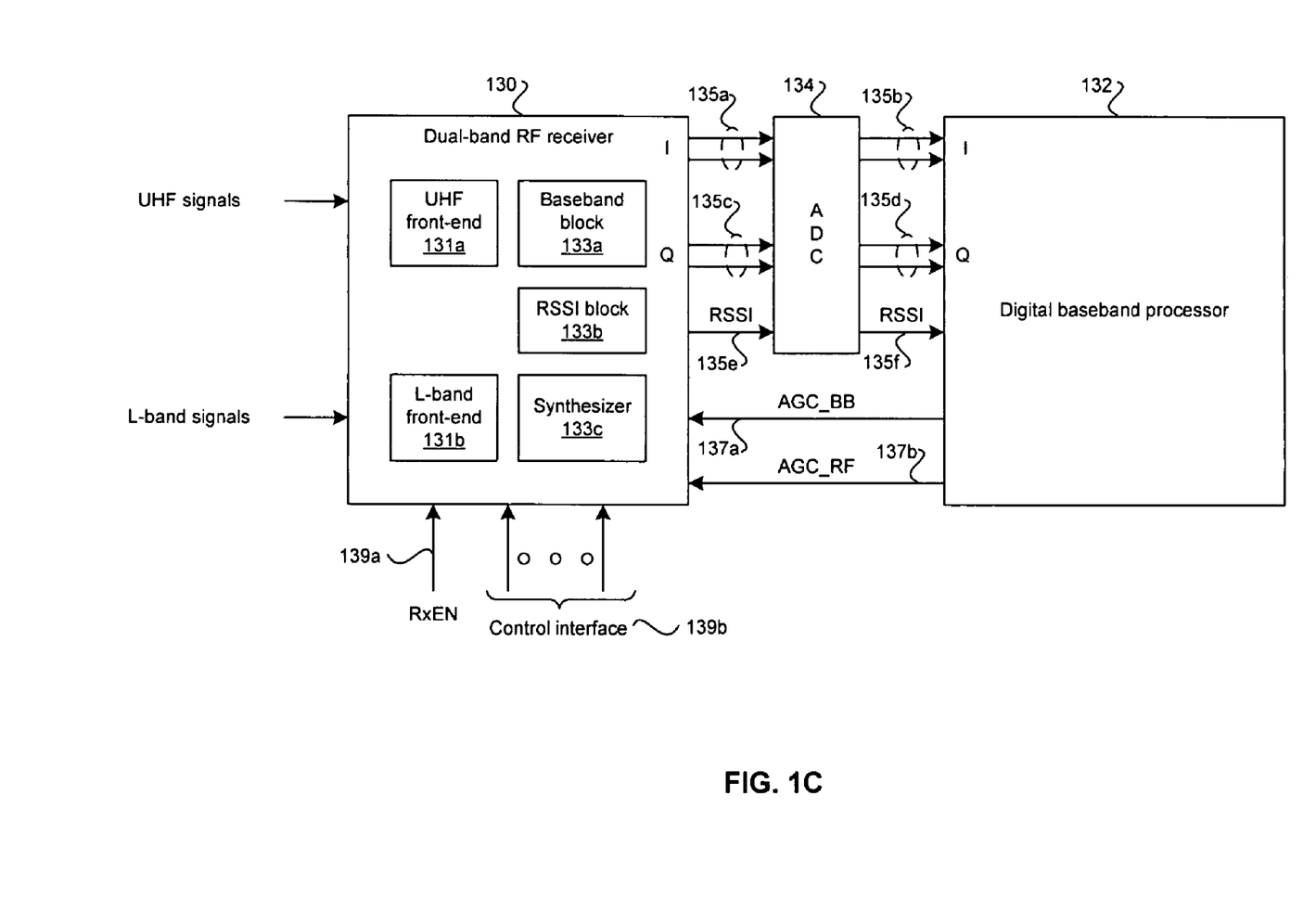
FIG. 1C is a block diagram illustrating exemplary communication between a dual-band RF receiver and a digital baseband processor in a mobile terminal, in accordance with an embodiment of the invention.

FIG. 1C is a block diagram illustrating exemplary communication between a dual-band RF receiver and a digital baseband processor in a mobile terminal, in accordance with an embodiment of the invention. Referring to FIG. 1C, there is shown a dual-band RF receiver 130, an analog-to-digital converter (ADC) 134, and a digital baseband processor 132. The dual-band RF receiver 130 may comprise a UHF front-end 131a, an L-band front-end 131b, a baseband block 133a, a received signal strength indicator (RSSI) block 133b, and a synthesizer 133c. The dual-band RF receiver 130, the analog-to-digital converter (ADC) 134, and/or the digital baseband processor 132 may be part of a mobile terminal, such as the mobile terminal 120 in FIG. 1B, for example.

The dual-band RF receiver 130 may comprise suitable logic, circuitry, and/or code that may enable handling of UHF and L-band signals. The dual-band RF receiver 130 may be enabled via an enable signal, such as the signal RxEN 139a, for example. In this regard, enabling the dual-band RF receiver 130 via the signal RxEN 139a by a 1:10 ON/OFF ratio may allow time slicing in DVB-H while reducing power consumption. At least a portion of the circuitry within the dual-band RF receiver 130 may be controlled via the control interface 139b. The control interface 139b may receive information from, for example, a processor, such as the processor 125 in FIG. 1B, or from the digital baseband processor 132. The control interface 139b may comprise more than one bit. For example, when implemented as a 2-bit interface, the control interface 139b may be an inter-integrated circuit (I2C) interface.

The UHF front-end 131a may comprise suitable logic, circuitry, and/or code that may enable low noise amplification and direct down conversion of UHF signals. In this regard, the UHF front-end 131a may utilize an integrated low noise amplifier (LNA) and mixers, such as passive mixers, for example. The UHF front-end 131a may communicate the resulting baseband frequency signals to the baseband block 133a for further processing.

The L-band front-end 131b may comprise suitable logic, circuitry, and/or code that may enable low noise amplification and direct down conversion of L-band signals. In this regard, the L-band front-end 131b may utilize an integrated LNA and mixers, such as passive mixers, for example. The L-band front-end 131b may communicate the resulting baseband frequency signals to the baseband block 133a for further processing. The dual-band RF receiver 130 may enable one of the UHF front-end 131a and the L-band front-end 131b based on current communication conditions.

The synthesizer 133c may comprise suitable logic, circuitry, and/or code that may enable generating the appropriate local oscillator (LO) signal for performing direct down conversion in either the UHF front-end 131a or the L-band front-end 131b. Since the synthesizer 133c may enable fractional division of a source frequency when generating the LO signal, a large range of crystal oscillators may be utilized as a frequency source for the synthesizer 133c. This approach may enable the use of an existing crystal oscillator in a mobile terminal PCB, thus reducing the number of external components necessary to support the operations of the dual-band RF receiver 130, for example. The synthesizer 133c may generate a common LO signal for the UHF front-end 131a and for the L-band front-end 131b. In this regard, the UHF front-end 131a and the L-band front-end 131b may enable dividing the LO signal in order to generate the appropriate signal to perform down conversion from the UHF band and from the L-band respectively. In some instances, the synthesizer 133c may have at least one integrated voltage controlled oscillator (VCO) for generating the LO signal. In other instances, the VCO may be implemented outside the synthesizer 133c.

The baseband block 133a may comprise suitable logic, circuitry, and/or code that may enable processing of I/Q components generated from the direct down conversion operations in the UHF front-end 131a and the L-band front-end 131b. The baseband block 133a may enable amplification and/or filtering of the I/Q components in analog form. The baseband block 133a may communicate the processed I component, that is, signal 135a, and the processed Q component, that is, signal 135c, to the ADC 134 for digital conversion.

The RSSI block 133b may comprise suitable logic, circuitry, and/or code that may enable measuring the strength, that is, the RSSI value, of a received RF signal, whether UHF or L-band signal. The RSSI measurement may be performed, for example, after the received RF signal is amplified in either the UHF front-end 131a or the L-band front-end 131b. The RSSI block 133b may communicate the analog RSSI measurement, that is, signal 135e, to the ADC 134 for digital conversion.

The ADC 134 may comprise suitable logic, circuitry, and/or code that may enable digital conversion of signals 135a, 135c, and/or 135e to signals 135b, 135d, and/or 135f respectively. In some instances, the ADC 134 may be integrated into the dual-band RF receiver 130 or into the digital baseband processor 132.

The digital baseband processor 132 may comprise suitable logic, circuitry, and/or code that may enable processing and/or handling of baseband frequency signals. In this regard, the digital baseband processor 132 may be the same or substantially similar to the digital baseband processor 129 described in FIG. 1B. The digital baseband processor 132 may enable generating at least one signal, such as the signals AGC_BB 137a and AGC_RF 137b, for adjusting the operations of the dual-band RF receiver 130. For example, the signal AGC_BB 137a may be utilized to adjust the gain provided by the baseband block 133a on the baseband frequency signals generated from either the UHF front-end 131a or the L-band front-end 131b. In another example, the signal AGC_RF 137b may be utilized to adjust the gain provided by an integrated LNA in either the UHF front-end 131a or the L-band front-end 131b. In another example, the digital baseband processor 132 may generate at least one control signal or control information communicated to the dual-band RF receiver 130 via the control interface 139b for adjusting operations within the dual-band RF receiver 130.

Figure 1D:
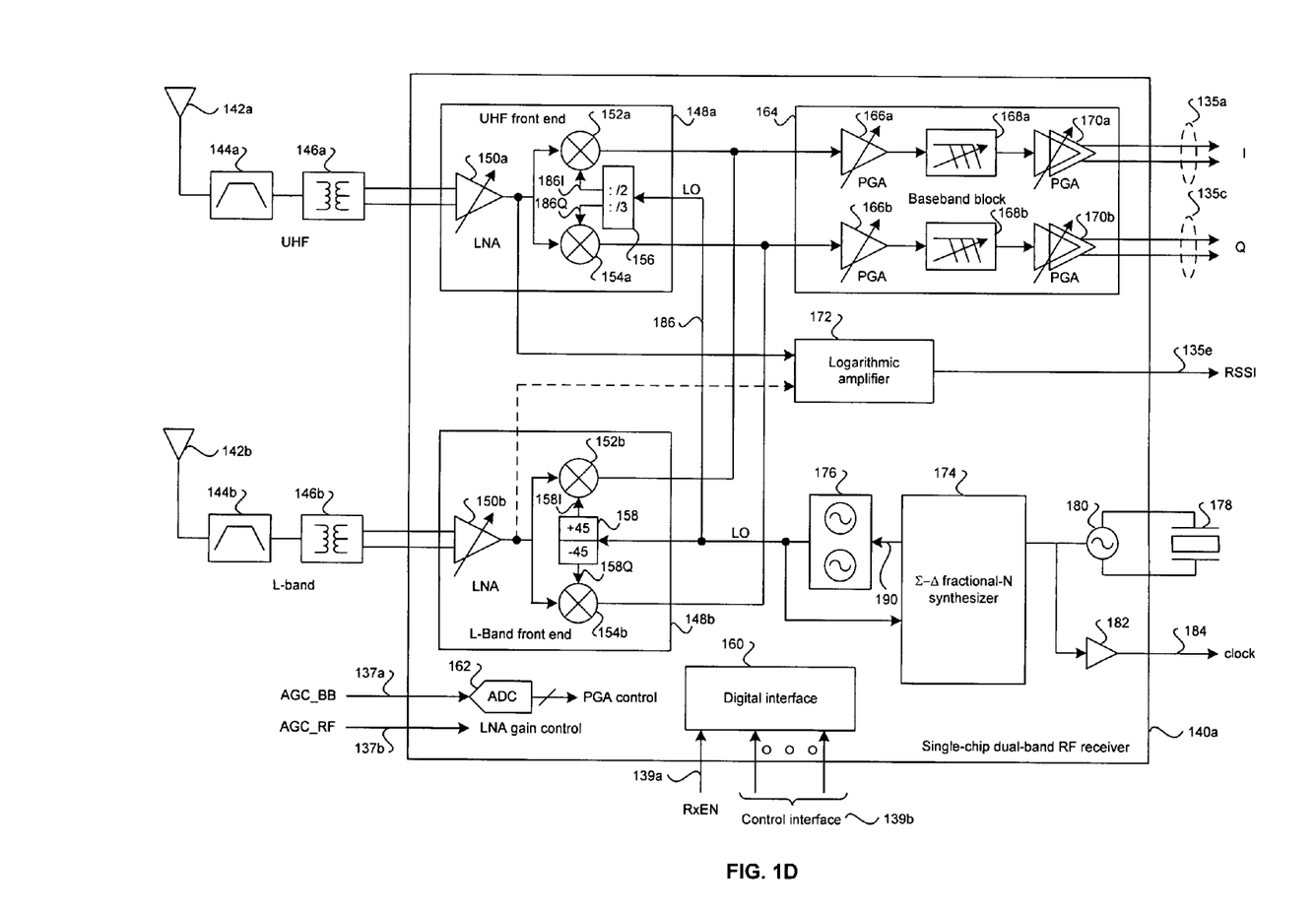
FIG. 1D is a block diagram illustrating an exemplary single-chip dual-band RF receiver with an integrated LNA in each front-end, in accordance with an embodiment of the invention.

FIG. 1D is a block diagram illustrating an exemplary single-chip dual-band RF receiver with an integrated LNA in each front-end, in accordance with an embodiment of the invention. Referring to FIG. 1D, there is shown a single-chip dual-band RF receiver 140a that may comprise a UHF front-end 148a, an L-band front-end 148b, a baseband block 164, a logarithmic amplifier (logarithmic amplifier) 172, a Σ-Δ fractional-N synthesizer 174, a VCO block 176, a digital interface 160, an ADC 162, an oscillator 180, and a buffer 182.

The single-chip dual-band RF receiver 140a may be fabricated using any of a plurality of semiconductor manufacturing processes, for example, complimentary metal-oxide-semiconductor (CMOS) processes, bipolar CMOS (BiCMOS), or Silicon Germanium (SiGe). The single-chip dual-band RF receiver 140a may be implemented using differential structures to minimize noise effects and/or substrate coupling, for example. The single-chip dual-band RF receiver 140a may utilize low drop out (LDO) voltage regulators to regulate and clean up on-chip voltage supplies. In this regard, the LDO voltage regulators may be utilized to transform external voltage sources to the appropriate on-chip voltages.

When the single-chip dual-band RF receiver 140a is implemented utilizing a CMOS process, some design considerations may include achieving low noise figure (NF) values, wide-band operation, high signal-to-noise ration (SNR), performing DC offset removal, achieving high input second-order and third-order intercept points (IIP2 and IIP3), and/or reducing I/Q mismatch, for example.

The single-chip dual-band RF receiver 140a may receive UHF signals via a first antenna 142a, a UHF filter 144a, and a first balun 146a. The UHF filter 144a enables band pass filtering, wherein the band pass may be about 470 to about 702 MHz for cellular signals, for example, or about 470 to about 862 MHz, for other types of received signals, for example. The balun 146a enables balancing the filtered signals before being communicated to the UHF front-end 148a.

The single-chip dual-band RF receiver 140a may receive L-band signals via a second antenna 142b, an L-band filter 144b, and a second balun 146b. The L-band filter 144b enables band pass filtering, wherein the band pass may be about 1670 to about 1675 MHz for signals in US systems, for example, or about 1450 to about 1490 MHz, for signals in European systems, for example. The balun 146b enables balancing the filtered signals before being communicated to the L-band front-end 148b. In some instances, antennas 142a and 142b may be implemented utilizing a single antenna communicatively coupled to the single-chip dual-band RF receiver 140a that may support receiving radio signals operating in the UHF IV/V and/or L-band, for example.

The UHF front-end 148a may comprise a variable low noise amplifier (LNA) 150a, a mixer 152a, a mixer 154a, and a LO signal divider 156. The variable LNA 150a may comprise suitable logic and/or circuitry that may enable amplification of the UHF signals received. Matching between the output of the balun 146a and the input of the variable LNA 150a may be achieved by utilizing off-chip series inductors, for example. The variable LNA 150a may implement continuous gain control by current steering that may be controlled by a replica scheme within the variable LNA 150a. The gain of the variable LNA 150a may be adjusted via the signal AGC_RF 137b, for example.

The mixers 152a and 154a may comprise suitable logic and/or circuitry that may enable generating in-phase (I) and quadrature (Q) components of the baseband frequency signal based on direct down conversion of the amplified received UHF signal with the quadrature signals 186I and 186Q generated by the divider block 156. The mixers 152a and 154a may be passive mixers in order to achieve high linearity and/or low flicker noise, for example. The LO signal divider 156 may comprise suitable logic, circuitry, and/or code that may enable dividing of the LO signal 186 by a factor of 2 (:/2) or a factor of 3 (:/3) and at the same time provide quadrature outputs 186I and 186Q, wherein 186I and 186Q have 90 degrees separation between them. The factor of 3 division may be used when the received UHF signal band is about 470 to about 600 MHz, for example. The factor of 2 division may be used when the received UHF signal band is about 600 to about 900 MHz, for example. The I/Q components generated by the mixers 152a and 154a may be communicated to the baseband block 164.

The L-band front-end 148b may comprise a variable LNA 150b, a mixer 152b, a mixer 154b, and a LO signal generator 158. The variable LNA 150b may comprise suitable logic and/or circuitry that may enable amplification of the L-band signals received. Matching between the output of the balun 146b and the input of the variable LNA 150b may be achieved by utilizing off-chip series inductors, for example. The variable LNA 150b may implement continuous gain control by current steering that may be controlled by a replica scheme within the variable LNA 150b. The gain of the variable LNA 150b may be adjusted via the signal AGC_RF 137b, for example.

The mixers 152b and 154b may comprise suitable logic and/or circuitry that may enable generating I/Q components of the baseband frequency signal based on the direct down conversion of the amplified received L-band signal with the LO signals 158I and 158Q generated by the LO generator block 158. The mixers 152b and 154b may be passive mixers in order to achieve high linearity and/or low flicker noise, for example. The LO signal generator 158 may comprise suitable logic, circuitry, and/or code that may enable generation of quadrature LO signals 158I and 158Q, that is, signals with 90 degree phase split between them, from the LO signal 186. The I/Q components generated by the mixers 152b and 154b may be communicated to the baseband block 164.

The logarithmic amplifier 172 may comprise suitable logic, circuitry, and/or code that may enable generation of a wideband, received signal strength indicator (RSSI) signal, such as the signal 135e, based on the output of the variable LNA 150a. The RSSI signal indicates the total amount of signal power that is present at the output of the LNA, for example. The RSSI signal may be utilized by, for example, the digital baseband processor 132 in FIG. 1C, to adjust the gain of the variable LNA 150a in the presence of RF interference to achieve NF and/or linearity performance that meets blocking and/or intermodulation specifications, for example. In this regard, interference may refer to blocker signals, for example. Blocker signals may be unwanted signals in frequency channels outside the wanted or desired channel that may disturb the reception of the wanted signals. This effect may be a result of blockers generating large signals within the receiver path. These large signals may introduce harmonics, intermodulation products, and/or unwanted mixing products that crosstalk with the wanted signals. In another embodiment of the invention, the logarithmic amplifier 172 may enable generating a wideband, RSSI signal, such as the signal 135e, based on the output of the variable LNA 150b. In this instance, the RSSI signal may be utilized by to adjust the gain of the variable LNA 150b.

The baseband block 164 may comprise an in-phase component processing path and a quadrature component processing path. The in-phase processing path may comprise at least one programmable gain amplifier (PGA) 166a, a baseband filter 168a, and at least one PGA 170a. The quadrature component processing path may comprise at least one PGA 166b, a baseband filter 168b, and at least one PGA 170b. The PGAs 166a, 166b, 170a, and 170b may comprise suitable logic, circuitry, and/or code that may enable amplification of the down converted components of the baseband frequency signal generated by the RF front-end. The gain of the PGAs 166a, 166b, 170a, and 170b may be digitally programmable. In addition, at the output of the PGAs 166a and 166b, a programmable pole may be utilized to reduce linearity requirements for the baseband filters 168a and 168b respectively. Since the static and time-varying DC offset may saturate the operation of the single-chip dual-band RF receiver 140a, the PGAs 166a, 166b, 170a, and 170b may utilize DC servo loops to address DC offset issues. The gain of the PGAs 166a, 166b, 170a, and/or 170b may be controlled via the AGC_BB signal 137a, for example. In this regard, the ADC 162 may be utilized to provide digital control of the PGAs 166a, 166b, 170a, and/or 170b when the AGC_BB signal 137a is an analog signal.

The baseband filters 168a and 168b may comprise suitable logic, circuitry, and/or code that may enable channel selection, for example. Channel selection may be performed by filters, such as an $N^{th}$ order lowpass Chebyschev filter implemented by active integrators in a leapfrog configuration, for example. For the correct tuning of the characteristics of the filters, an on-chip auto-calibration loop may be activated upon power-up. The auto-calibration loop may set up the corner frequency to the correct value required to meet the requirements of the communications standard for which the receiver is designed. For DVB-T/DVB-H, the value $f_o$ of the filter response may be set to a value from 2 to 5 MHz thus supporting the different channel bandwidths of 5-8 MHz specified by DVB-T/DVB-H standards. During auto-calibration, a tone at the appropriate $f_{-3dB}$ may be generated on-chip and may be applied at the input of the baseband filters 168a and 168b for comparison with the filter output of a root-mean-squared (RMS) detector. A digitally controlled loop may be utilized to adjust the baseband filter bandwidth until the output of the baseband filter and the RMS detector are the same.

The Σ-Δ fractional-N synthesizer 174 may comprise suitable logic, circuitry, and/or code that may enable LO generation that may be independent of the reference crystal frequency, such as the crystal 178, for example. In this regard, the synthesizer 174 may generate a signal, such as the signal 190, for example, to control the operation of the VCO block 176 and therefore the generation of the LO signal 186. Since the synthesizer 174 may enable fractional synthesis, the single-chip dual band RF receiver 140a may utilize the same crystal utilized by other operations in the mobile terminal while maintaining fine tuning capability. The synthesizer 174 may receive a reference frequency signal from the crystal 178 via an oscillator 180, for example. The output of the oscillator 180 may also be buffered by the buffer 182 to generate a clock signal 184, for example.

The VCO block 176 may comprise suitable logic, circuitry, and/or code that may enable generating the LO signal 186 utilized by the UHF front-end 148a and the L-band front-end 148b for direct down conversion of the received RF signals. The VCO block 176 may comprise at least one VCO, wherein each VCO may have cross-coupled NMOS and PMOS devices and metal-oxide-semiconductor (MOS) varactors in an accumulation mode for tuning. In this regard, a switched varactor bank may be utilized for providing coarse tuning. The VCO block 176 may provide a range of about 1.2 to about 1.8 GHz when implemented utilizing two VCOs, for example. When more than one VCO is utilized in implementing the VCO block 176, selecting the proper VCO for generating the LO signal 186 may be based on the type of RF signal being received by the single-chip dual band RF receiver 140a.

The digital interface 160 may comprise suitable logic, circuitry, and/or code that may enable controlling circuitry within the single-chip dual band RF receiver 140a. The digital interface 160 may comprise a plurality of registers for storing control and/or operational information for use by the single-chip dual-band RF receiver 140a. The digital interface 160 may enable receiving the signal RxEN 139a that may be utilized to perform 1:10 ON/OFF ratio time slicing in DVB-H while reducing power consumption. Moreover, the digital interface 160 may enable receiving the control interface 139b from, for example, a processor, such as the processor 125 in FIG. 1B, or from the digital baseband processor 132 in FIG. 1C. The control interface 139b may comprise more than one bit. The control interface 139b may be utilized to control the synthesis operations of the synthesizer 174 and/or the filtering operations of the baseband filters 168a and 168b. The control interface 139b may also be utilized to adjust the bias of circuits within the single-chip dual-band RF receiver 140a, such as those of the variable LNAs 150a and 150b, the PGAs 166a, 166b, 170a, and 170b, and/or the baseband filters 168a and 168b, for example.

Figure 1E:
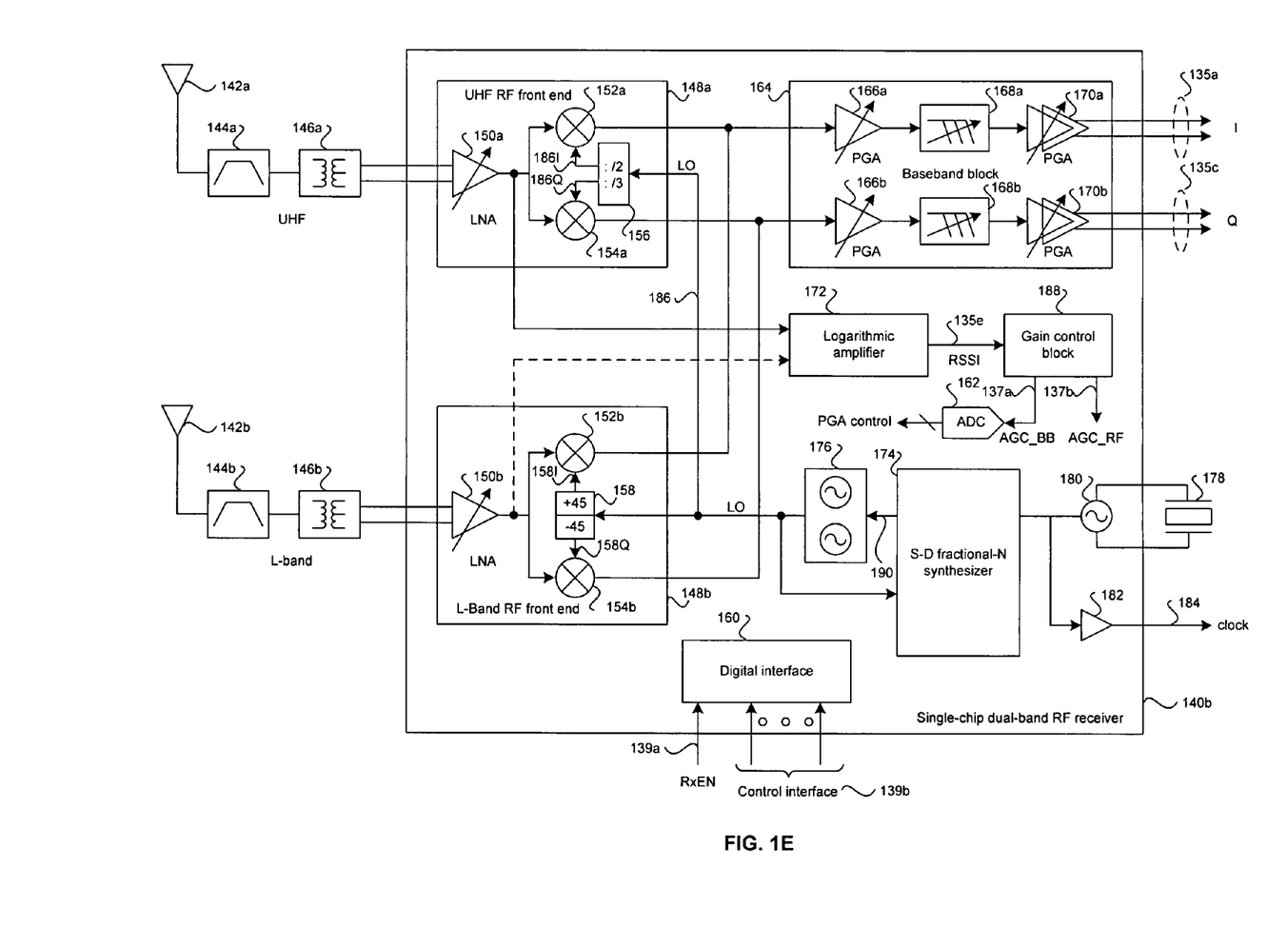
FIG. 1E is a block diagram illustrating an exemplary single-chip dual-band RF receiver with on-chip gain control processing, in accordance with an embodiment of the invention.

FIG. 1E is a block diagram illustrating an exemplary single-chip dual-band RF receiver with on-chip gain control processing, in accordance with an embodiment of the invention. Referring to FIG. 1E, there is shown a single-chip dual-band RF receiver 140b that may differ from the single-chip dual-band RF receiver 140a in FIG. 1D in that a gain control block 188 may be integrated into the single-chip dual-band RF receiver 140b. The gain control block 188 may comprise suitable logic, circuitry, and/or code that may enable on-chip gain adjustment for the variable LNAs 150a and 150b and for the PGAs 166a, 166b, 170a, and 170b. In this regard, the gain control block 188 may receive the RSSI signal 135e and may generate the signals AGC_BB 137a and AGC_RF 137b, for example.

Figure 2:
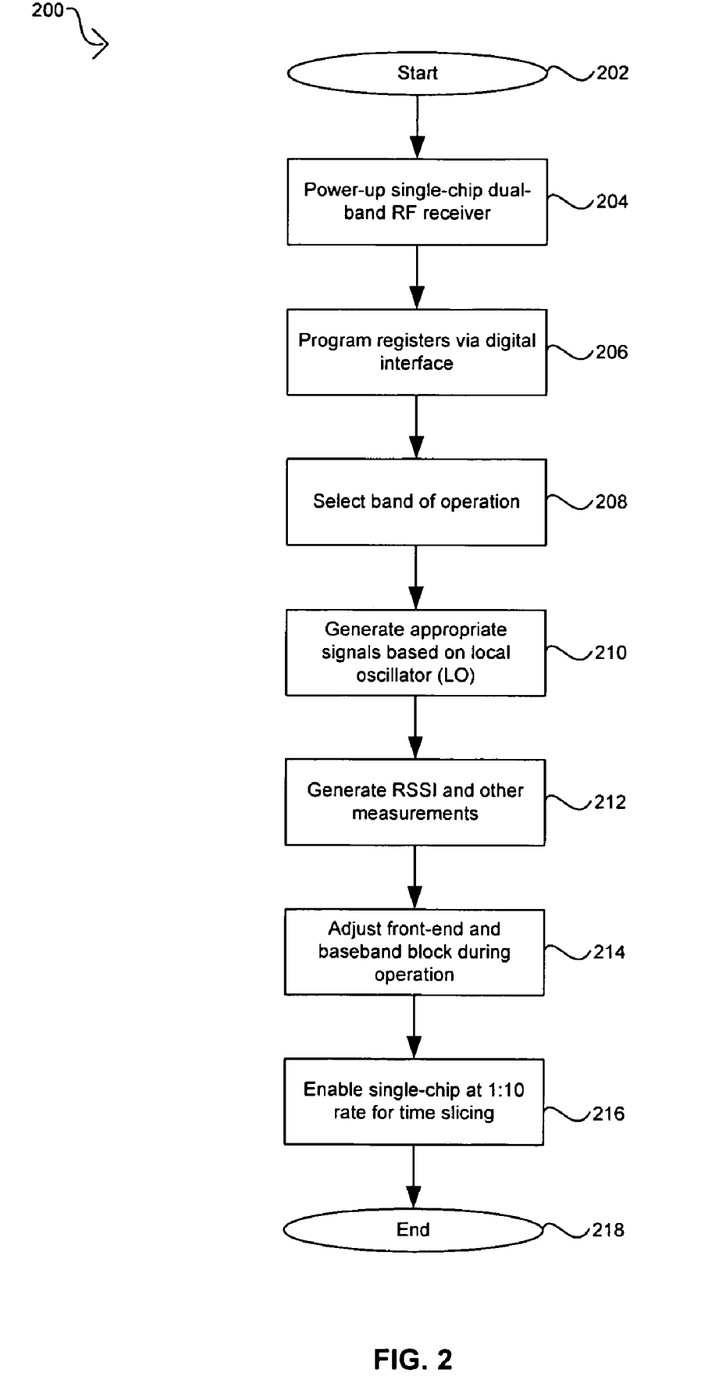
FIG. 2 is a flow diagram illustrating exemplary steps in the operation of a single-chip dual-band RF receiver, in accordance with an embodiment of the invention.

FIG. 2 is a flow diagram illustrating exemplary steps in the operation of a single-chip dual-band RF receiver, in accordance with an embodiment of the invention. Referring to FIG. 2, there is shown a flow diagram 200. In step 204, after start step 202, a single-chip dual-band RF receiver, such as the single-chip dual-band RF receiver 140a and 140b, for example, may be powered up in a mobile terminal. In step 206, the RF receiver may be enabled via signal RxEN 139a and control and/or operational information may be programmed into the digital interface 160 via the control interface 139b for use by the RF receiver during operation.

In step 208, an operating frequency band may be selected via the control interface 139b. In this regard, if the mobile terminal is to receive UHF signals, the UHF front-end 148a, the baseband block 164, and/or the synthesizer 174 may be configured for receiving and processing UHF signals in the RF receiver. If the mobile terminal is to receive L-band signals, the L-band front-end 148b, the baseband block 164, and/or the synthesizer 174 may be configured for receiving and processing L-band signals in the RF receiver. In step 210, the synthesizer 174 and the VCO block 176 may be utilized to generate the appropriate value for the LO signal 186 base on the band of operation.

In step 212, the RF receiver may measure an RSSI for the output of the variable LNA of the currently operating front-end for determining the amount of adjusting or backing off that may be required from the variable LNA. The amount of adjusting may be determined off-chip or on-chip as described in FIGS. 1D and 1E respectively. Other measurements may be performed in the front-end circuits 148a and 148b and/or the baseband block 164 that may be utilized to adjust biasing levels within the RF receiver. In step 214, the front-end circuits 148a and 148b and/or the baseband block 164 may be adjusted, when necessary, based on measurements performed in step 212. In step 216, during DVB-H operation, the RF receiver may be enabled utilizing a 1:10 ON/OFF ratio for time slicing in DVB-H and to reduce power consumption. After step 216, the process may proceed to end step 218.

It should be recognized that although a single-chip dual-band RF receiver is illustrated, for example in FIG. 1E, the invention is not limited in this regard. Accordingly, the principles disclosed herein may be applied to a single-chip n-band RF receiver, where n is greater than 2. For example, coverage for a third band may be provided utilizing a single-chip tri-band RF receiver. Furthermore, coverage for a fourth band may be provided utilizing a single-chip quad-band RF receiver, and so on.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing wireless information, the method comprising:
   receiving a radio frequency (RF) signal in a single-chip multi-band RF receiver comprising a plurality of RF front-ends, wherein each of said plurality of RF front-ends handles processing of at least a UHF signal and an L-band signal;
   amplifying said received RF signal utilizing a low noise amplifier (LNA) integrated in one of said plurality of RF front-ends that corresponds to said received RF signal;
   directly converting within said single-chip multi-band RF receiver said amplified received RF signal to a baseband frequency signal utilizing one or more passive mixers, a fractional-N synthesizer, and a voltage-controlled oscillator (VCO) operably coupled to said fractional-N synthesizer; and
   prior to said direct conversion, determining within said single-chip multi-band RF receiver a received signal strength indicator (RSSI) value for said amplified received RF signal, wherein said determined RSSI value is utilized within said single-chip multi-band RF receiver to control a gain of one or more amplifiers.

2. The method according to claim 1, comprising amplifying said received RF signal in one of said plurality of RF front-ends that handles processing of said UHF signal when said received RF signal is said UHF signal.

3. The method according to claim 1, comprising amplifying said received RF signal in one of said plurality of RF front-ends that handles processing of said L-band signal when said received RF signal is said L-band signal.

4. The method according to claim 1, comprising adjusting within said single-chip multi-band RF receiver a gain for said LNA integrated in one of said plurality of RF front-ends that corresponds to said received RF signal based on said determined RSSI value.

5. The method according to claim 1, comprising adjusting externally to said single-chip multi-band RF receiver a gain for said LNA integrated in one of said plurality of RF front-ends that corresponds to said received RF signal based on said determined RSSI value.

6. The method according to claim 1, comprising generating within said single-chip multi-band RF receiver an in-phase (I) component and a quadrature (Q) component of said directly converted baseband frequency signal.

7. The method according to claim 6, comprising filtering each of said generated components utilizing at least one corresponding programmable filter.

8. The method according to claim 6, comprising amplifying each of said generated components utilizing at least one corresponding programmable gain amplifier.

9. The method according to claim 8, comprising adjusting a gain of said at least one corresponding programmable gain amplifier via a gain control signal.

10. The method according to claim 1, comprising controlling circuitry within said single-chip multi-band RF receiver via an on-chip digital interface.

11. The method according to claim 1, wherein said single-chip multi-band RF receiver is a CMOS integrated circuit.

12. A system for processing wireless information, the system comprising:
    a single-chip multi-band radio frequency (RF) receiver comprising a plurality of RF front-ends, wherein each of said plurality of RF front-ends is operable to handle processing of at least a UHF signal and an L-band signal;
    said single-chip multi-band RF receiver being operable to receive an RF signal;
    said single-chip multi-band RF receiver being operable to amplify said received RF signal utilizing a low noise amplifier (LNA) integrated in one of said plurality of RF front-ends that corresponds to said received RF signal;
    said single-chip multi-band RF receiver being operable to directly convert within said single-chip multi-band RF receiver said amplified received RF signal to a baseband frequency signal utilizing one or more passive mixers, a fractional-N synthesizer, and a voltage-controlled oscillator (VCO) operably coupled to said fractional-N synthesizer; and
    prior to said direct conversion, said single-chip multi-band RF receiver being operable to determine a received signal strength indicator (RSSI) value for said amplified received RF signal, wherein said single-chip multi-band RF receiver is operable to utilize said determined RSSI value to control a gain of one or more amplifiers in said single-chip multi-band RF receiver.

13. The system according to claim 12, wherein said single-chip multi-band RF receiver is operable to amplify said received RF signal in one of said plurality of RF front-ends that handles processing of said UHF signal when said received RF signal is said UHF signal.

14. The system according to claim 12, wherein said single-chip multi-band RF receiver is operable to amplify said received RF signal in one of said plurality of RF front-ends that handles processing of said L-band signal when said received RF signal is said L-band signal.

15. The system according to claim 12, wherein said single-chip multi-band RF receiver is operable to on-chip adjust a gain for said LNA integrated in one of said plurality of RF front-ends that corresponds to said received RF signal based on said determined RSSI value.

16. The system according to claim 12, wherein said single-chip multi-band RF receiver is operable to off-chip adjust a gain for said LNA integrated in one of said plurality of RF front-ends that corresponds to said received RF signal based on said determined RSSI value.

17. The system according to claim 12, wherein said single-chip multi-band RF receiver is operable to on-chip generate an in-phase (I) component and a quadrature (Q) component of said directly converted baseband frequency signal.

18. The system according to claim 17, wherein said single-chip multi-band RF receiver is operable to filter each of said generated components utilizing at least one corresponding programmable filter.

19. The system according to claim 17, wherein said single-chip multi-band RF receiver is operable to amplify each of said generated components utilizing at least one corresponding programmable gain amplifier.

20. The system according to claim 19, wherein said single-chip multi-band RF receiver is operable to adjust a gain of said at least one corresponding programmable gain amplifier via a gain control signal.

21. The system according to claim 12, wherein said single-chip multi-band RF receiver is operable to off-chip control of circuitry within said single-chip multi-band RF receiver via an on-chip digital interface.

22. The system according to claim 12, wherein said single-chip multi-band RF receiver is a CMOS integrated circuit.

23. The system according to claim 12, wherein said a plurality of RF front-ends in said single-chip multi-band RF receiver are communicatively coupled to at least one antenna.

24. A system for processing wireless information, the system comprising:
   a receiver in an integrated circuit comprising a first radio frequency (RF) front-end and a second RF front-end, wherein said first RF front-end is operable to process signals from a first frequency band and said second RF front-end is operable to process signals from a second frequency band different from said first frequency band;
   said receiver comprising a fractional-N synthesizer operable to generate a local oscillator signal;
   said first RF front-end being operable to directly convert a received RF signal corresponding to said first frequency band to a baseband signal utilizing said local oscillator signal;
   said second RF front-end being operable to directly convert a received RF signal corresponding to said second frequency band to a baseband signal utilizing said local oscillator signal;
   said receiver being operable to amplify said received RF signal corresponding to said first frequency band and said received RF signal corresponding to said second frequency band; and
   said receiver being operable to determine, prior to said direct conversion, one or both of a received signal strength indicator (RSSI) value for said amplified received RF signal corresponding to said first frequency band and an RSSI value for said amplified received RF signal corresponding to said second frequency band, wherein one or both of said determined RSSI values are utilized within said receiver to control a gain of one or more amplifiers.

25. The system of claim 24, wherein said fractional-N synthesizer is a sigma-delta fractional-N synthesizer.

26. The system of claim 24, wherein said first RF front-end is operable to divide down a frequency of said local oscillator signal.

27. The system of claim 24, wherein said first frequency band comprises UHF frequencies and said second frequency band comprises L-band frequencies.

* * * * *